United States Patent Office 3,058,243
Patented Oct. 16, 1962

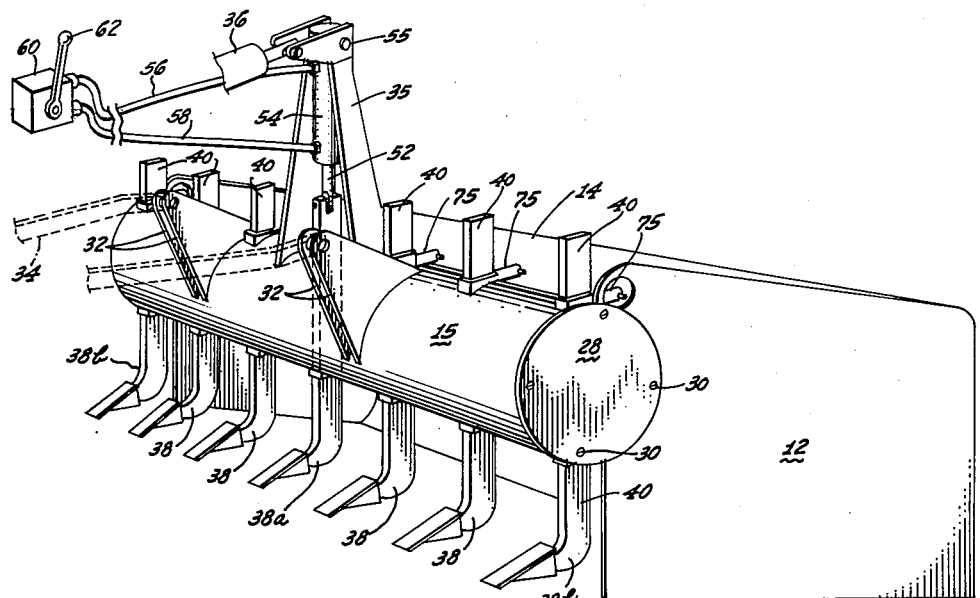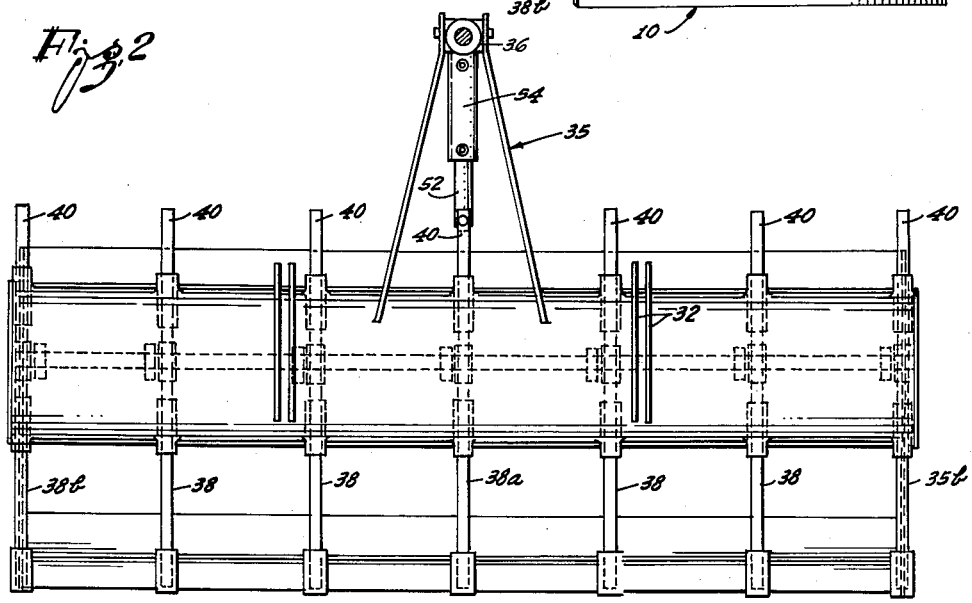

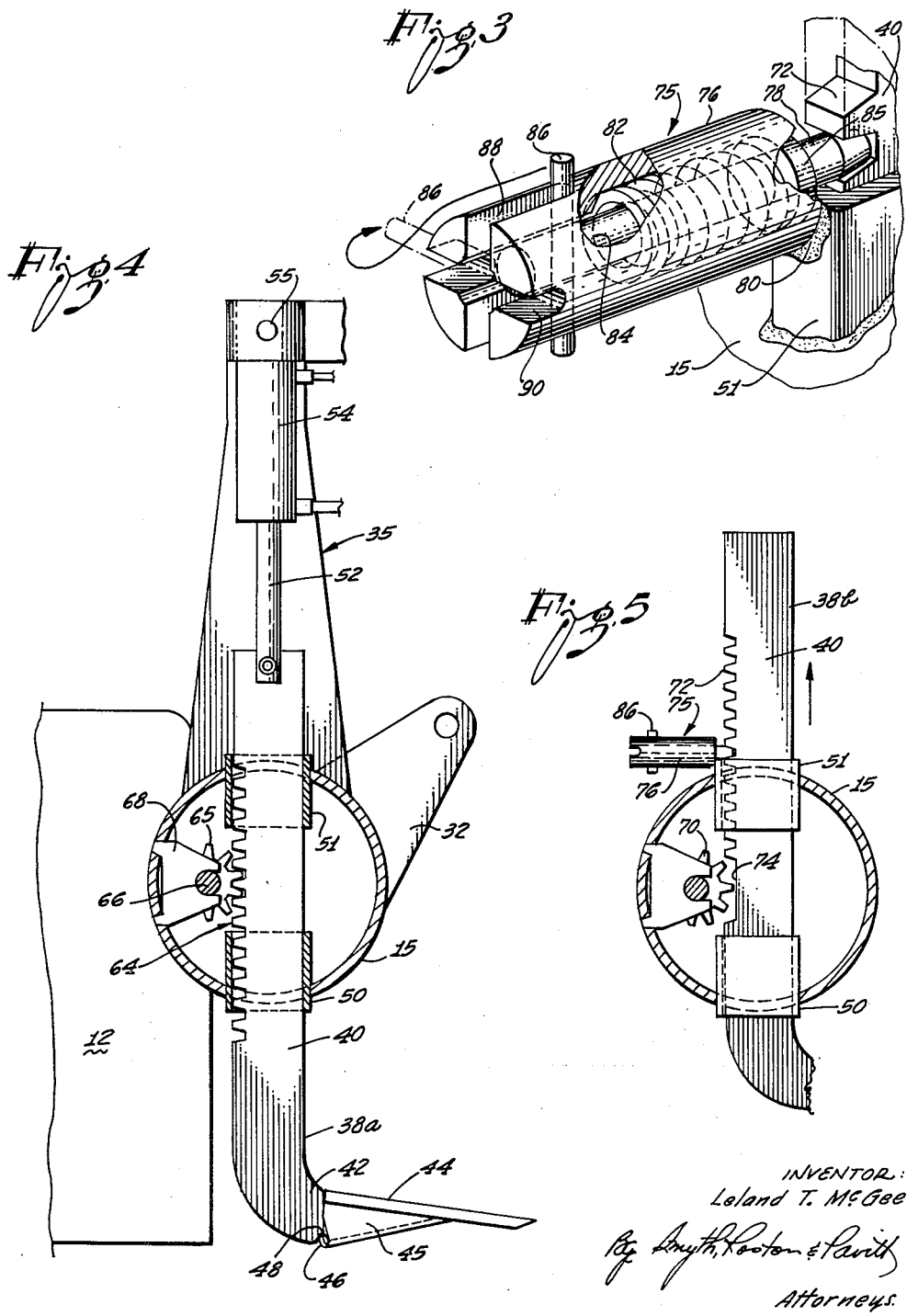

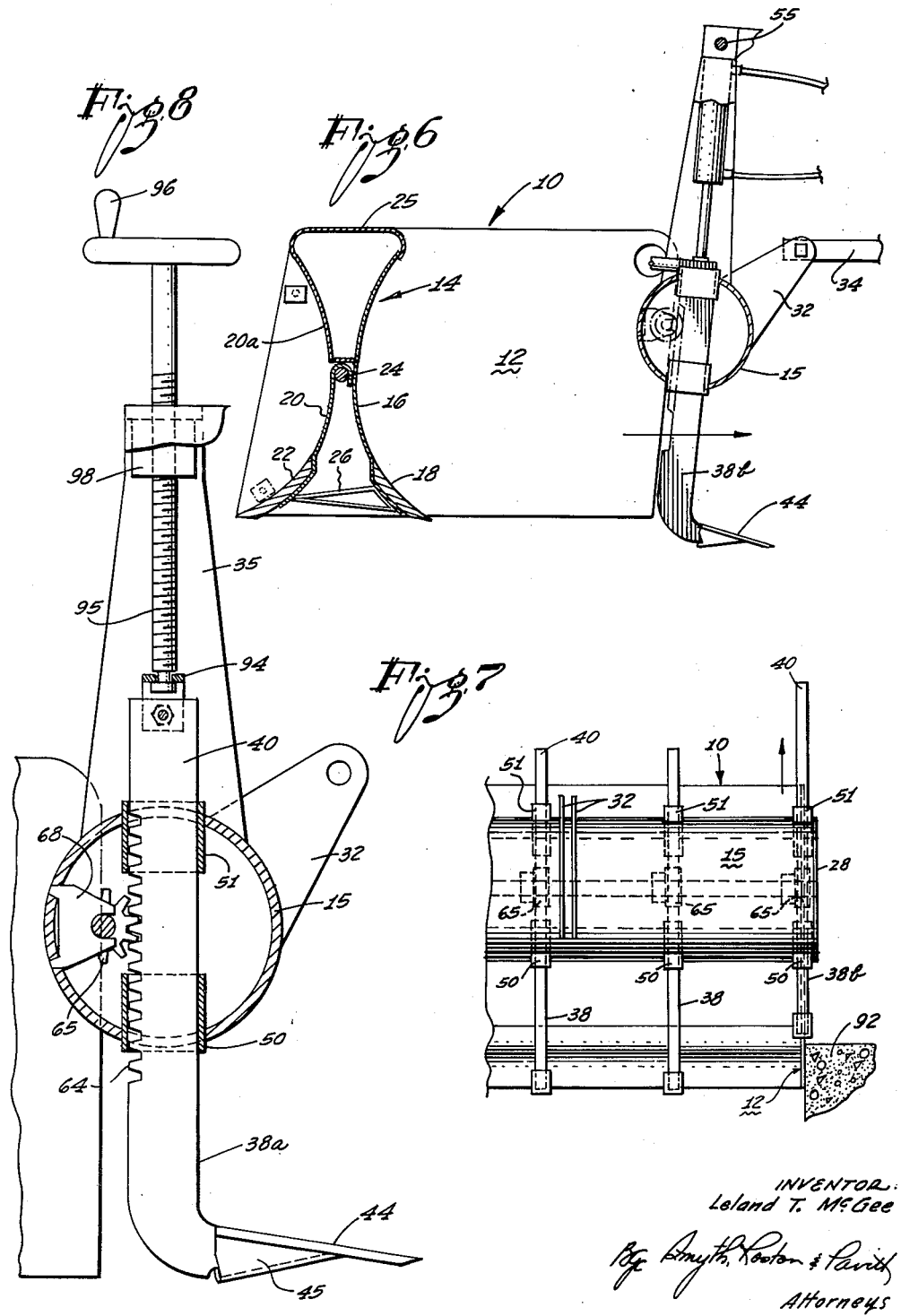

3,058,243
EARTH WORKING IMPLEMENT
Leland T. McGee, 410 Dixon Ave., Compton, Calif.
Filed Dec. 14, 1961, Ser. No. 159,332
12 Claims. (Cl. 37—145)

This invention relates to an earth working implement for operation by a tractor and, more particularly, relates to an earth moving implement comprising a scraper bowl with rearward scraper means, the scraper bowl being provided with a forward row of digger teeth.

One problem to which the invention is directed is to provide such an implement in which the digger teeth are not only vertically adjustable but are also rigidly connected with the scraper bowl by structure capable of withstanding the inevitable high magnitude operating stresses. This problem is solved by mounting the adjustable teeth in upright guide sleeves in a forward transverse beam that rigidly interconnects the two side plates of the scraper bowl.

In the preferred practice of the invention the rearward scraper means is a transverse hollow structure that also rigidly interconnects the two side plates. Thus the scraper bowl, in effect, comprises two vertical side plates rigidly interconnected by two hollow beams, the rear hollow beam being the scraper means and the forward hollow beam carrying the row of adjustable digger teeth. Such a structure is capable of withstanding high magnitude stresses in torque as well as heavy impacts and stresses both in tension and compression.

A second problem is to make the row of digger teeth adjustable with respect to depth of penetration into the soil. Preferably, provision should be made for such adjustment by remote control from the tractor. This problem is met by providing actuating means to operate one of the digger teeth and by operatively connecting the remaining digger teeth to the one tooth for adjustment in unison therewith. By virtue of this arrangement, the one actuated tooth may be termed the master digger tooth and the remaining digger teeth may be termed the slave digger teeth. Preferably the master digger tooth is centrally positioned in the row of digger teeth.

A feature of the initial embodiment of the invention is that the mechanism for operatively connecting the slave digger teeth to the master digger tooth is concealed in and protected by the forward transverse beam in which the digger teeth are mounted. All of the digger teeth are formed with or provided with toothed racks and each rack is adapted to mesh with a corresponding pinion on a transverse shaft that is journalled in the hollow beam.

The actuating means for the master digger tooth may be any simple mechanism such as a manually operable screw. In the preferred practice of the invention, however, a hydraulic power cylinder is mounted on the implement to actuate the master digger tooth. Such a power cylinder may be connected to the hydraulic system of the tractor for remote operation by a control valve on the tractor.

A third problem met by the invention is to make the digger teeth selectively retractible to elevated positions. It may be desirable, for example, to elevate a digger tooth at one end of the row of digger teeth to permit the implement to work close to a newly formed concrete curb without damage to the curb. In other instances it may be desirable to elevate the teeth of one-half of the row to permit the digging force to be concentrated on the teeth of the other half of the row.

The invention solves this last problem by two co-operating provisions. One provision is to make the toothed racks of the slave digger teeth shorter than the toothed rack of the master digger tooth so that the pinions associated with the slave digger teeth run off the ends of the racks when the slave digger teeth are elevated. With the shorter racks of the slave digger teeth out of engagement with the corresponding pinions on the transverse shaft, the slave digger teeth are operatively disconnected from the master digger tooth. The second provision is a latch for each of the slave digger teeth. With all of the slave digger teeth raised by the corresponding pinions, selected digger teeth may be further elevated slightly by manual force and then may be latched to remain elevated and unaffected by the pinions when the master digger tooth is again lowered to operative position.

The features and advantages of the invention may be understood from the following detailed description and the accompanying drawings.

In the drawings, which are to be regarded as merely illustrative:

FIG. 1 is a perspective view of the presently preferred embodiment of the invention;

FIG. 2 is a front elevation;

FIG. 3 is an enlarged perspective view with parts broken away, showing the construction of a latch for releasably holding a slave digger tooth in elevated position;

FIG. 4 is a vertical sectional view showing how the rack of the master digger tooth engages a corresponding pinion on a cross shaft;

FIG. 5 is a similar view showing how the rack of a slave digger tooth is shortened to permit disengagement from the corresponding pinion on the cross shaft;

FIG. 6 is a longitudinal vertical sectional view of the implement in operation with the digger teeth lowered to operative positions;

FIG. 7 is a fragmentary front elevational view showing a digger tooth at one end of the row elevated to permit the implement to work close to a curb; and FIG. 8 is a view similar to FIG. 4 showing how a manually operable screw may be used instead of a hydraulic cylinder to vary the elevation of the master digger tooth.

In the selected embodiment of the invention, the scraper bowl, generally designated 10, comprises a pair of parallel vertical side plates 12 which are interconnected at their rear ends by a hollow scraper structure 14 and are interconnected at their forward ends by a hollow transverse structure 15, in the form of a cylindrical beam. The scraper structure 14 comprises a forward curved scraper plate 16 provided with a removable blade element 18 and a rearward scraper plate 20 provided with a removable blade element 22. The rearward scraper plate 20 is made in two sections, the lower section being reinforced by a transverse rod 24 that is welded to the two side plates 12 and the upper section 20a being continuous with a top plate 25 that extends to the upper edge of the forward scraper plate 16. The lower portions of the forward scraper plate 16 and the rearward scraper plate 20 may be interconnected by reinforcement members 26.

The forward hollow beam 15 is welded to the two side plates 12 and protrudes forward from the side plates as shown in FIGS. 1 and 6. The opposite ends of the hollow beam 15 are closed by disks 28 secured by suitable screws 30. As best shown in FIG. 1, two pairs of triangular pull plates 32 are welded to the hollow beam 15 on its forward side for connection in a well known manner to a tractor (not shown) by a pair of traction members or draw bars 34. Also welded to the hollow beam 15 is a pair of arms forming an upwardly extending A-frame 35. The upper end of this A-frame is adapted to be connected in a well known manner to the tractor by a hydraulic cylinder 36 which may be actuated to tilt the scraper bowl forward or backward.

In accord with the teachings of the invention a plurality of digger teeth 38 are arranged in a row along the hollow beam 15. In this particular embodiment of the invention there are seven digger teeth 38 including a central digger tooth 38a and two digger teeth 38b at the opposite ends respectively, of the row. Each digger tooth 38 is formed with a shank 40 and a forwardly turned toe 42 which carries a replaceable point 44. As best shown in FIG. 4, each replaceable point 44 has a shoe portion 45 which fits onto the toe 42 and which has a pliable tongue 46 that is turned into locking engagement with a cooperating recess 48 of the toe. The shank 40 of each of the digger teeth 38 extends upward through a pair of aligned rectangular guide sleeves 50 and 51 which are mounted in the lower and upper walls respectively of the hollow beam 15, the shanks being freely slidable in the guide sleeves.

The central digger tooth 38a may be termed the master digger tooth and the remaining six digger teeth may be termed the slave digger teeth since the central digger tooth is power-actuated and the remaining digger teeth are adapted to follow the movements of the master digger tooth. The upper end of the shank 40 of the master digger tooth 38a is connected to a piston rod 52 of a hydraulic power cylinder 54 that is mounted in the A-frame 35 by trunnions 55. Portions at the upper and lower ends of the hydraulic power cylinder 54 are connected by two hoses 56 and 58 respectively to a four-way valve 60 on the tractor. The four-way valve 60 has a control handle 62 which may be swung forward or rearward from a neutral position to cause the hydraulic power cylinder 54 to raise and lower the master digger tooth 38a in a well known manner. At the neutral position of the handle 62, the four-way valve 60 functions as a hydraulic lock to maintain the master digger tooth 38a at selected positions of elevation.

The slave digger teeth 38 and 38b may be adapted for operative connection with the master digger tooth 38a in any suitable manner. In this particular embodiment of the invention the shank 40 of the master digger tooth 38a is formed with a toothed rack 64 on its rear edge as best shown in FIG. 4. The toothed rack 64 meshes with a pinion 65 on a transverse shaft 66 which extends throughout the length of the interior of the hollow beam 15. The transverse shaft 66 is mounted on suitable bearings 68 inside the hollow beam 15 and has keyed thereto a plurality of additional pinions 70 that correspond respectively with the six slave digger teeth 38 and 38b.

Each of the slave digger teeth, for example, each of the end digger teeth 38b shown in FIG. 5, is provided with a toothed rack 72 for engagement with the corresponding pinion 70. Each of the toothed racks 72 of the slave digger teeth 38 and 38b differs from the toothed rack 64 of the master digger tooth 38a in being shorter than the toothed rack 64. In effect, the teeth in the lower end of each toothed rack 72 are omitted to provide a recess 74 (FIG. 5) which is dimensioned to clear the corresponding pinion 70.

It is apparent that when the hydraulic power cylinder 54 is activated to raise the master digger tooth 38a, the toothed rack 64 of the master digger tooth operates the corresponding pinion 65 to rotate the shaft 66 with the various pinions 70 to cause the slave digger teeth 38 and 38b to be lifted upward in unison with the master digger tooth. As soon as the recess 74 of each slave digger tooth 38 and 38b reaches the corresponding pinion 70, however, the slave digger tooth becomes operatively disengaged from the corresponding pinion 70. The slave digger tooth is then maintained at its elevated position because the path of the toothed rack 72 of the slave digger tooth is intercepted by the corresponding pinion 70. If the pinion 70 continues to rotate in a direction to lift the slave digger tooth, the lower end of the toothed rack of the slave digger tooth merely clicks from one tooth to another of the pinion. When the pinion 70 ceases to rotate in the direction to elevate the slave digger tooth, the lower end of the toothed rack 72 of the slave digger tooth comes to rest on a tooth of the pinion 70.

In accord with the teaching of the invention, each of the slave digger teeth 38 and 38b may be manually elevated slightly from this upper position of rest so as to cause the recess 74 to completely clear the corresponding pinion 70 and then the elevated pinion tooth may be held in its elevated position by a corresponding latch that is generally designated 75 in FIGS. 3 and 5.

As best shown in FIG. 3, each of the six latches 75 for the six slave digger teeth 38 and 38b comprises a horizontal cylinder 76 which slidingly houses a latch plunger 78, the latch plunger being positioned to engage the toothed rack 72 of the slave digger tooth in the manner shown in FIG. 5. Each latch cylinder 76 is mounted by welding 80 on the upper end of the corresponding upper guide sleeve 51. As indicated in FIG. 3, the latch plunger 78 of each latch 75 is urged towards the toothed rack 72 of the corresponding slave digger tooth 38 or 38b by a coil spring 82. The coil spring 82 is compressed between an inner circumferential shoulder 84 of the latch cylinder 76 and a collar 85 of the latch plunger 78.

As shown in FIG. 3, the latch plunger 78 of each latch 75 is provided with a diametrical pin 86 which serves as a handle for manipulating the plunger. At the latching position of the plunger 78 shown in FIG. 3, the diametrical pin 86 is seated in a relatively long diametrical slot 88 of the latch cylinder 76. To retract the latch plunger 78 and keep the latch plunger retracted when desired, the latch plunger is manually retracted by means of the diametrical pin 76 until the pin clears the end of the latch cylinder and then the diametrical pin 76 is rotated 90° to enter a second shorter diametrical slot 90. The diametrical slot 90 is short enough to hold the latch plunger 78 retracted out of engagement with the toothed rack 72 of the slave digger tooth.

The manner in which the implement operates to serve its purpose may be readily understood from the foregoing description. The scraper bowl 10 may be tilted forward or rearward as desired by activating the hydraulic cylinder 36 by remote control from the tractor. FIGS. 1 and 6 show all of the digger teeth 38, 38a and 38b lowered to effective positions for digging into the earth in advance of the scraper bowl 10. The depth of penetration of the digger teeth may be varied at will from a remote station on the tractor by simply manipulating the handle 62 of the four-way valve 60. It is important to note that the two end digger teeth 38b are aligned with the two side plates 12 so that the two end digger teeth dig grooves into the soil in alignment with the side plates to permit the side plates to sink into the earth so that the scraper bowl may effectively engage the earth that is loosened by the digger teeth.

If it is desirable to elevate one or more of the slave digger teeth 38 and 38b, the operator manipulates the valve handle 62 to elevate all of the digger teeth until the recesses 74 of the shanks of the slave digger teeth 38 and 38b reach the corresponding pinions 70 for operative disengagement of the slave digger teeth from the pinions. The operator then manually elevates slightly each of the selected slave digger teeth and manipulates the corresponding latch 75 to cause the latch to engage the rack 72 of the digger tooth to maintain the slave digger tooth in elevated position with the rack 72 of the slave digger tooth raised out of contact with the corresponding pinion 70.

The three digger teeth 38 and 38b to one side of the master digger tooth 38a may be elevated in this manner to concentrate all of the weight of the scraper bowl on the remaining four digger teeth. FIG. 7 shows how one of the two end digger teeth 38b may be elevated in this manner to clear a concrete curb 92 and to permit the scraper bowl 10 to travel close to the curb without damage to the curb.

When it is desired to lower a latched slave digger tooth, the valve handle 62 is manipulated to raise the master digger tooth 38a to raise all of the lowered slave digger teeth until the recesses 74 of the slave digger teeth reach the corresponding pinions 70. Each of the latched slave digger teeth is then unlatched to permit the slave digger tooth to drop until the rack 72 of the slave digger tooth comes to rest on the corresponding pinion 70. The valve handle 62 may then be manipulated to lower the master digger tooth 38a with corresponding rotation of the shaft 66 to cause all of the pinions 70 to lower all of the corresponding slave digger teeth 38 and 38b.

In FIG. 8 which illustrates a modification of the invention most of the structure is identical with previously described structures indicated by the use of corresponding numerals to indicate corresponding parts. The purpose of FIG. 8 is to show that manual means instead of powered means may be used to elevate the master digger tooth 38a and thereby lift slave digger teeth along with the master digger tooth. In FIG. 8 the upper end of the shank 40 of the master digger tooth 38a is connected by a swivel joint 94 with the lower end of a screw 95 that is manually operable by a crank 96. The screw extends through a fixed nut 98 that is carried by the upper end of the A-frame 35.

My description in specific detail of the selected embodiment and modification of the invention will suggest various changes, substitutions and other departures from my disclosure within the spirit and scope of the appended claims.

I claim:
1. In an earth working implement for operation by a tractor, the combination of:
   a structure for coupling to the tractor;
   a plurality of digger teeth mounted on said structure for movement up and down relative thereto, each of said digger teeth having a toothed rack,
   one of said digger teeth being a master digger tooth and the other digger teeth being slave digger teeth;
   actuating means directly coupled to said master digger tooth to move the master digger tooth up and down;
   a transverse shaft extending adjacent to each of the digger teeth,
   a plurality of pinions on said transverse shaft corresponding to said digger teeth in mesh with the racks thereof whereby movement of the master digger tooth may be transmitted to the slave digger teeth; and
   means to latch said slave digger teeth selectively at elevated positions out of engagement with the corresponding pinions whereby the master digger tooth may be elevated to elevate all of the slave digger teeth, then one or more of the slave digger teeth may be latched, and then the master digger tooth may be lowered to lower the unlatched slave digger teeth.

2. A combination as set forth in claim 1 in which: each of the toothed racks of the slave digger teeth is formed with a recess positioned to be at the corresponding pinion when the digger tooth is elevated whereby when the recess reaches the pinion the slave digger tooth may be manually lifted slightly and then latched to make the digger tooth non-responsive to reverse rotation of the pinion.

3. A combination as set forth in claim 1 in which: said actuating means is a hydraulic power cylinder.

4. A combination as set forth in claim 1 in which: said actuating means is a manually operable screw means.

5. In an earth working implement for operation by a tractor, the combination of:
   a structure including a scraper bowl for coupling to the tractor
   said scraper bowl having two side walls;
   a row of digger teeth across the front of said bowl with the end teeth of the row aligned with said two side plates of the bowl,
   said digger teeth being mounted on said structure for movement up and down relative thereto;
   actuating means directly coupled to one of said digger teeth to move the digger tooth up and down;
   releasable means to operatively connect the remaining digger teeth with said one digger tooth for movement up and down therewith; and
   means to latch said remaining digger teeth selectively at elevated positions independently of said one digger tooth.

6. In an earth working implement for operation by a tractor, the combination of:
   a structure including a scraper bowl for coupling to the tractor, said bowl having two side walls;
   a row of digger teeth across the front of said bowl,
   said digger teeth being mounted for up and down movement relative to said structure,
   one of said digger teeth being a master digger tooth and the other digger teeth being slave digger teeth;
   means to raise and lower said master digger tooth;
   means operatively connected to said master digger tooth to elevate and lower said slave digger teeth in in unison with the master digger tooth,
   said slave digger teeth being releasable from the master digger tooth when all of the digger teeth are elevated; and
   means to releasably latch the slave digger teeth selectively at elevated positions with the latched teeth disconnected from the master tooth.

7. In an earth working implement for operation by a tractor, the combination of:
   a scraper bowl having opposite side walls and a rearward transverse scraper means;
   a hollow forward transverse structure rigidly interconnecting said side walls and adapted for connection with the tractor;
   a transverse row of digger teeth mounted in said transverse structure for up and down adjustment,
   one of said digger teeth being a master digger tooth and the remaining digger teeth being slave digger teeth;
   actuating means directly coupled to said master digger tooth for movement up and down of the master digger tooth;
   means to couple said slave digger teeth with said master digger tooth selectively for movement up and down in unison therewith; and
   means to latch said slave digger teeth selectively at elevated positions with the elevated slave teeth uncoupled from the master digger tooth.

8. A combination as set forth in claim 7 in which:
   two of said digger teeth are aligned with said two side plates respectively to dig grooves in the earth to receive the side plates.

9. A combination as set forth in claim 7 in which:
   said scraper means of the scraper bowl is a hollow structure united with the side plates and cooperating with said hollow forward transverse structure to make the scraper bowl rigid.

10. A combination as set forth in claim 7 in which: said forward transverse structure is a hollow beam.

11. A combination as set forth in claim 7 in which:
    each of said digger teeth has a shank of uniform cross section and in which a pair of aligned guide sleeves unitary with said transverse structure slidingly embraces each of said digger teeth shanks.

12. In an earth working implement for operation by a tractor, the combination of:
    a scraper bowl having opposite side walls and a rearward transverse scraper means;

a forward transverse structure rigidly interconnecting said side walls and adapted for connection with the tractor;
a transverse row of digger teeth mounted in said transverse structure for up and down adjustment, each of said digger teeth having a toothed rack;
a transverse shaft inside said forward transverse structure adjacent said teeth;
a plurality of pinions on said shaft for meshing with said racks respectively to operatively connect the slave digger teeth with the master digger tooth, the racks of the slave digger teeth being shorter than the rack of the master digger tooth for disengagement from the corresponding pinions at elevated positions of the slave digger teeth; and
means to latch said slave digger teeth selectively at elevated positions out of engement with the corresponding pinions.

References Cited in the file of this patent

UNITED STATES PATENTS

| | | |
|---|---|---|
| 1,523,189 | Floyd | Jan. 13, 1925 |
| 2,840,935 | Bird et al. | July 1, 1958 |
| 2,899,760 | Armington et al. | Aug. 18, 1959 |
| 2,912,774 | McCrary | Nov. 17, 1959 |
| 2,948,160 | Bedker | Aug. 9, 1960 |
| 2,986,828 | Lapins | June 6, 1961 |